US007909354B2

(12) United States Patent
Easton

(10) Patent No.: US 7,909,354 B2
(45) Date of Patent: Mar. 22, 2011

(54) WHEEL CHAIR

(75) Inventor: Campbell Bryce Easton, Dannevirke (NZ)

(73) Assignee: Metalform (Dannevirke) Limited, Dannevirke (NZ)

( * ) Notice: Subject to any disclaimer, the term of this patent is extended or adjusted under 35 U.S.C. 154(b) by 505 days.

(21) Appl. No.: 11/914,561

(22) PCT Filed: May 15, 2006

(86) PCT No.: PCT/NZ2006/000109
§ 371 (c)(1),
(2), (4) Date: Feb. 14, 2008

(87) PCT Pub. No.: WO2006/123944
PCT Pub. Date: Nov. 23, 2006

(65) Prior Publication Data

US 2008/0191452 A1 Aug. 14, 2008

(30) Foreign Application Priority Data

May 18, 2005 (NZ) ........................................ 540127

(51) Int. Cl.
*B62B 7/00* (2006.01)
*B62B 9/00* (2006.01)
*B62B 3/02* (2006.01)

(52) U.S. Cl. ...................... 280/643; 280/648; 280/47.41

(58) Field of Classification Search .................. 280/638, 280/639, 640, 642, 643, 647, 648, 650, 657, 280/47.34, 47.38, 47.41
See application file for complete search history.

(56) References Cited

U.S. PATENT DOCUMENTS

| | | | | |
|---|---|---|---|---|
| 4,375,840 | A | 3/1983 | Campbell | |
| 4,613,151 | A * | 9/1986 | Kielczewski | 280/650 |
| 5,011,175 | A * | 4/1991 | Nicholson et al. | 280/304.1 |
| 5,209,322 | A * | 5/1993 | McMahon | 180/271 |
| 5,356,172 | A * | 10/1994 | Levy et al. | 280/650 |
| 5,366,036 | A * | 11/1994 | Perry | 180/65.1 |
| 5,380,034 | A * | 1/1995 | Wilson | 280/657 |
| 5,558,361 | A * | 9/1996 | Shin | 280/124.15 |
| 5,601,302 | A * | 2/1997 | Beard et al. | 280/250.1 |
| 5,855,387 | A * | 1/1999 | Gill et al. | 280/283 |
| 5,924,720 | A * | 7/1999 | Keehne | 280/657 |
| 6,176,335 | B1 * | 1/2001 | Schaffner et al. | 180/65.1 |
| 6,394,476 | B1 * | 5/2002 | Molnar | 280/250.1 |

(Continued)

FOREIGN PATENT DOCUMENTS

DE 41 14 252 11/1992

(Continued)

*Primary Examiner* — J. Allen Shriver, II
*Assistant Examiner* — John R Olszewski
(74) *Attorney, Agent, or Firm* — Oblon, Spivak, McClelland, Maier & Neustadt, L.L.P.

(57) ABSTRACT

A wheelchair includes a chassis with rear wheels and front wheels mounted thereto. A support is pivotally coupled by a pivot axis to the chassis. A seat mount is pivotally coupled to the support. An electric actuator can move the support to cause the seat mount to be moved between raised and lowered positions. A clearance is provided between one or more power supply units and suspension mounts to enable the support to move therein during movement of the seat mount to and from the lowered position. The support and actuator are mounted by a mounting assembly that is mounted by guides so that the mounting assembly can be raised by the actuator to further elevate the seat mount.

19 Claims, 11 Drawing Sheets

U.S. PATENT DOCUMENTS

| | | | | |
|---|---|---|---|---|
| 6,540,250 | B1 * | 4/2003 | Peterson | 280/657 |
| 6,565,112 | B2 * | 5/2003 | Hanson et al. | 280/650 |
| 6,616,172 | B1 * | 9/2003 | Cockram | 280/647 |
| 7,516,977 | B2 * | 4/2009 | Wu et al. | 280/650 |
| 7,716,759 | B2 * | 5/2010 | Wilder | 5/83.1 |
| 2001/0005073 | A1 * | 6/2001 | Choi et al. | 280/647 |
| 2003/0122332 | A1 * | 7/2003 | Engels et al. | 280/47.38 |

FOREIGN PATENT DOCUMENTS

| | | |
|---|---|---|
| DE | 44 20 877 | 12/1995 |
| EP | 0 677 285 | 10/1995 |
| EP | 1 133 968 | 9/2001 |
| JP | 10-118131 | 5/1998 |
| WO | 03/065962 | 8/2003 |

* cited by examiner

WHEEL CHAIR

BACKGROUND TO THE INVENTION

This invention relates to a wheelchair.

Motorised wheelchairs are well known. They have particular application with very impaired mobility users. To provide optimum assistance to such users it is desirable that the seat height of the wheelchair be adjustable through a range from below normal ride height to above normal ride height. The latter, for example, enables the user to achieve an elevated height for say location of the user at a table or bench height.

One problem that can arise from such adjustability is that the stability of the wheelchair can become compromised due to changes in centre of gravity leading to off balance loads that can either make the user think or feel that the wheelchair is unstable or render the wheelchair unstable.

SUMMARY OF THE INVENTION

It is thus an object of the present invention to provide a wheelchair particularly suited for very limited mobility users whereby a user can raise and lower the seat of the wheelchair from its normal ride height and not compromise the stability of the wheelchair.

Wheelchair users can spend a considerable amount of time in a wheelchair and thus comfort becomes an issue. Thus during travel about in the wheelchair shocks can be transmitted through to the seat of the wheelchair and hence to the user. Also if the wheelchair does not feel stable when traversing uneven or rough ground, the ride quality experienced or perceived by the user can be less than ideal.

It is a further object of the present invention to provide a wheelchair of a construction that provides improved ride quality for the user.

Broadly according to one aspect of the invention there is provided a wheelchair including a chassis, rear and front wheels mounted to the chassis, a support means pivotally coupled to the chassis and a seat mount, moving means to selectively move the support means relative to the chassis to cause the seat mount to be moved between raised and lowered positions, and a clearance provided between one or more of power supply units and suspension mounts to enable the support means to move therein during movement of the seat mount to and from the lowered position.

In a preferred form of the invention the wheelchair includes a pair of batteries power pack mounts whereby a pair of batteries or power packs can be mounted in a spaced apart array.

In a preferred form of the invention there are two front wheels, each front wheel is coupled to an arm one end of which is coupled to a mount located to one side of the clearance.

According to a preferred form of the invention the pair of batteries or power packs are located below a seat, mounted by the seat mount, when the seat is in a normal ride position.

According to a second broad aspect of the invention there is provided a wheelchair including a chassis, a seat mount carried by the chassis, rear wheels independently sprung by suspension means, front wheels each front wheel being coupled to an arm which is pivotally coupled to the chassis, shock absorbing means coupled between the arms and operable to permit the arm of one front wheel to move about its pivot coupling independent of the arm of the other front wheel upon a shock loading being applied to said one wheel.

BRIEF DESCRIPTION OF THE DRAWINGS

In the following more detailed description of a preferred embodiment of the invention, reference will be made to the accompanying drawings in which.

DETAILED DESCRIPTION OF A PREFERRED EMBODIMENT OF THE INVENTION

According to the present invention the wheelchair is of a construction, as will hereinafter be described, whereby a user can lower a seat mounted by the seat mount right to the floor or ground level and raise the seat above a normal in-use position. This raising and lowering motion is achieved in a two stage motion, as will herein be described.

A wheelchair according to one embodiment of the invention, as described herein, provides a four-wheel wheelchair with suspension that includes independent rear suspension and front suspension capable of allowing one front wheel to move independent of the other under shock loading. This leads to improved ride quality for the user.

Figure 10:
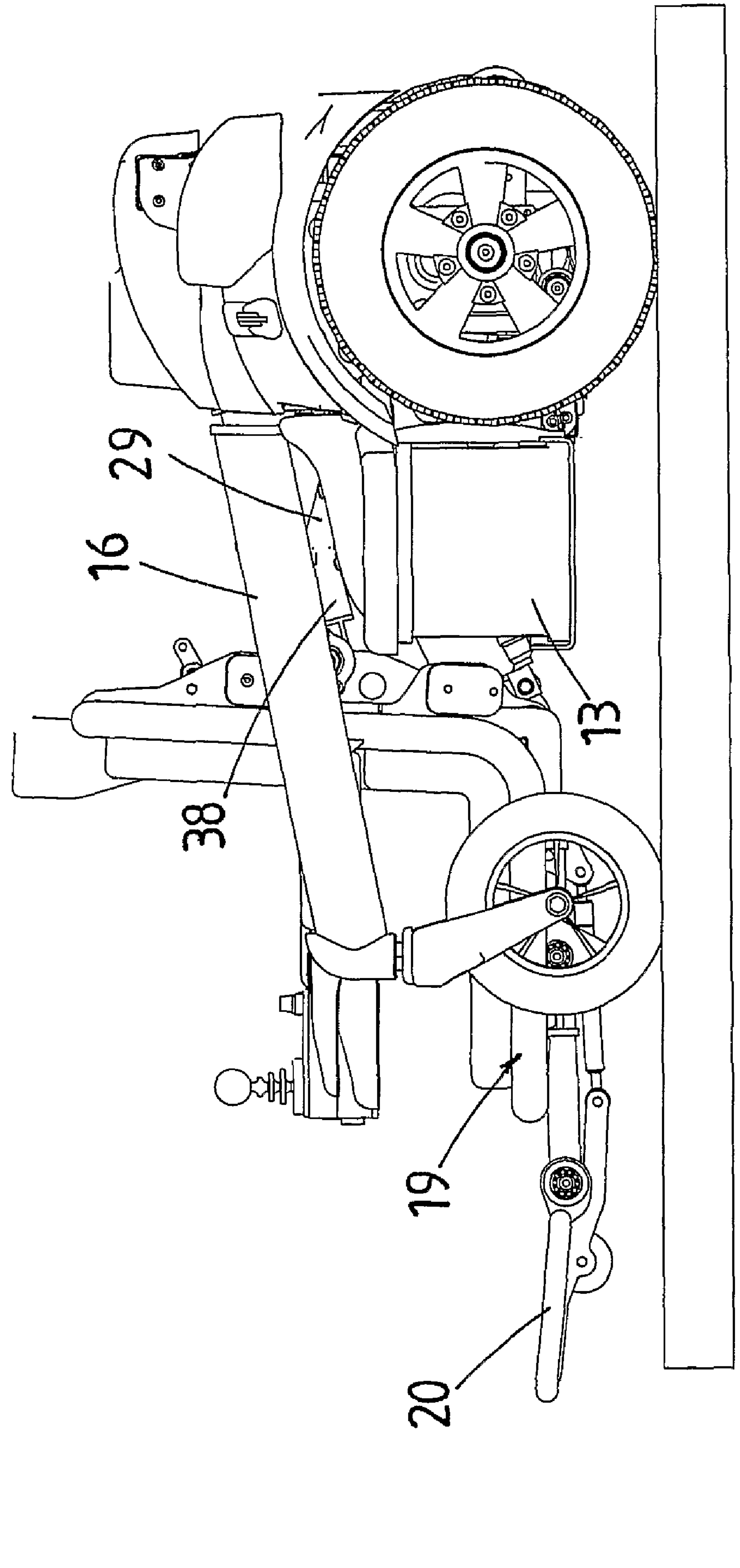
FIG. 10 is a side elevation view showing the extent of lowering of the seat.

As shown in FIG. 10, the wheelchair according to the present invention has the ability to raise and lower the seat between a Position 1, where the seat is located at ground level and a Position 2, which is where the user will have the seat located, when travelling around in the wheelchair, at full speed or near full speed. As will be apparent from the construction, shown in the drawings and disclosed herein, the seat when moving from Position 1 to Position 2 rotates about a pivot and moves upwards and backwards yet still maintains the correct orientation for the comfort and safety of the user. Therefore, there is not a simple linear up/down motion. As a consequence of the seat rotation during movements between Positions 1 and 2, it is possible to obtain the desired positioning of the seat at Position 1 yet have the chair in Position 2 located in a stable position where the centre of gravity is substantially in the centre of the front and rear wheels.

As will hereinafter be described, the seat moves up vertically in order to move from Position 2 to Position 3. The movement to Position 3 will occur when the user wishes to be at a higher position e.g. to reach something in a cupboard or work at a bench both of which are higher than reasonably accessible to a user when in Position 2.

The wheelchair 10 has a chassis 11 suitably constructed to provide anchor points for moving elements, a pair of electric motors M, a platform 12 for a pair of batteries 13 and suspension mountings. A space 14 is provided between the batteries 13 and also pivot mounts 15 to which arms 16 are pivotally attached via suitable bushes. The arms 16 can thus rotate about axis of rotation A. At the distal ends of the arms 16 are wheel mounts 17 to which front wheels 18 are rotatably mounted in a jockey wheel fashion to the arms 16.

In the drawings there is shown a seat construction 19. As will be known to those skilled in the art, the seat of a wheelchair of this nature will generally be of a construction suitable for the needs of the actual user of the chair. Therefore, the seat 19, as shown in the drawings, is simply for illustrative purposes.

The seat 19 includes a footplate or support 20 that is pivoted about pivot 21 to an arm 22 pivotally coupled via pivot 23 to the underside of the base 24 of the seat 19. To complete a parallelogram type linkage, a second link 25 is pivotally coupled at 26 to the underside of base 24 of chair 19. This link 25 is coupled to an element 27 that extends from the underside of the foot support 20.

Figure 3:
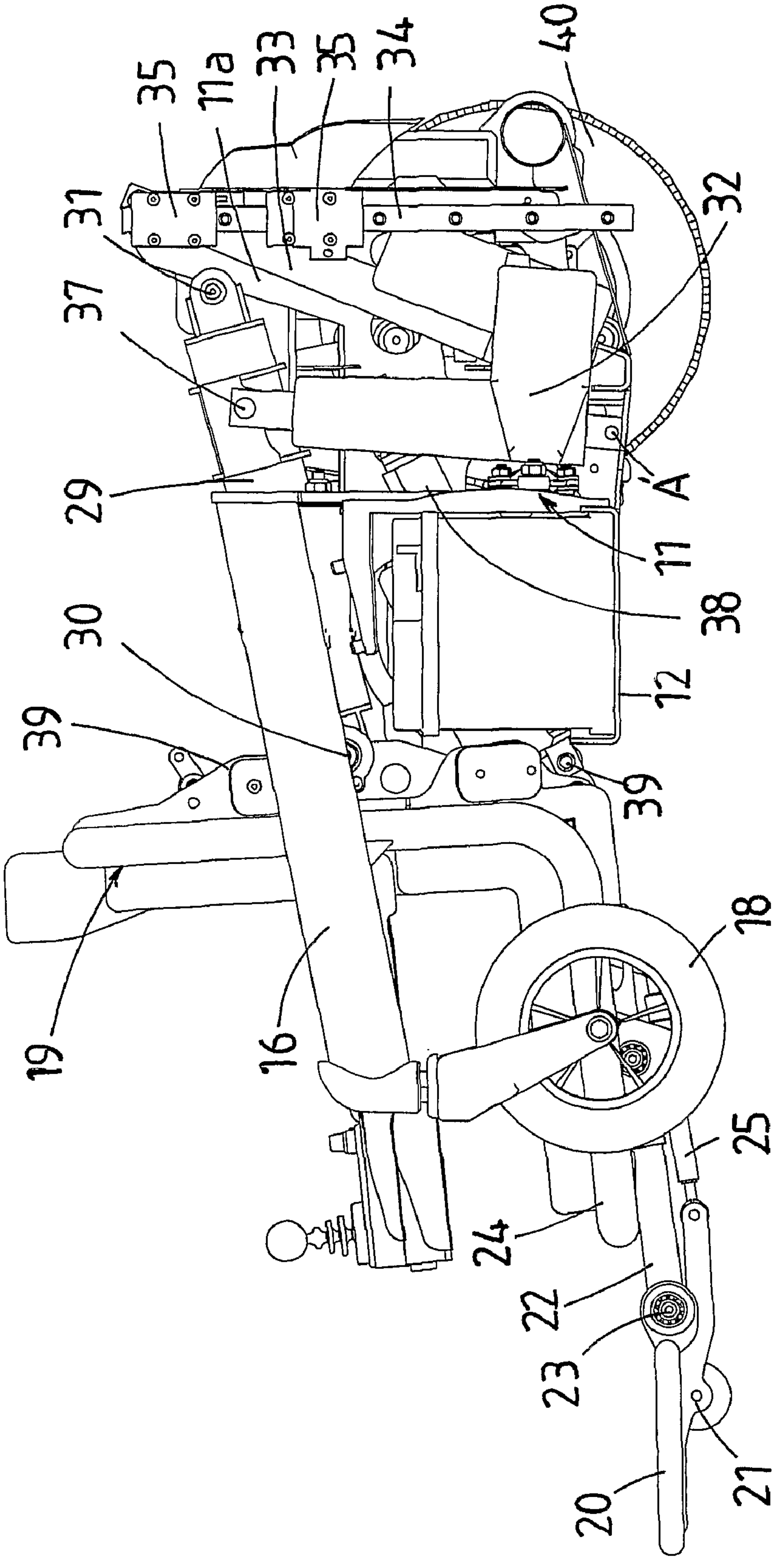
FIG. 3 is a view similar to FIG. 2 but showing the wheelchair in a configuration where the chair has been lowered to its lowermost position.
Figure 7:
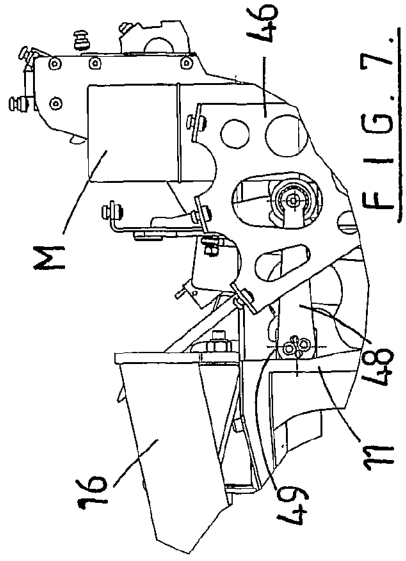
FIG. 7 is detailed A of FIG. 6.
Figure 5:
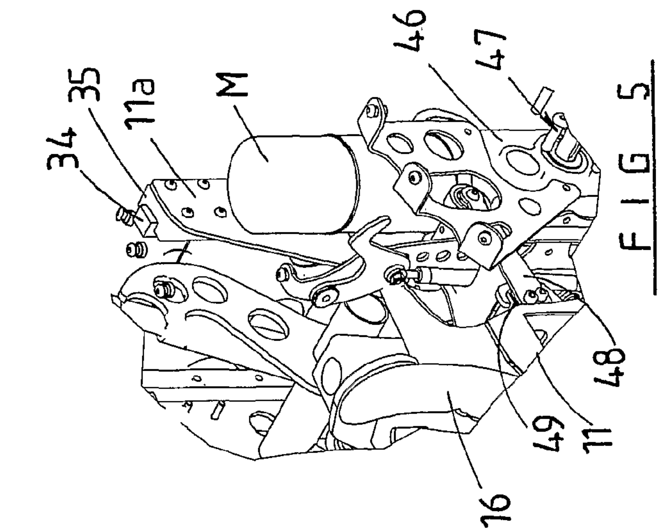
FIG. 5 is detailed B of FIG. 4.
Figure 6:
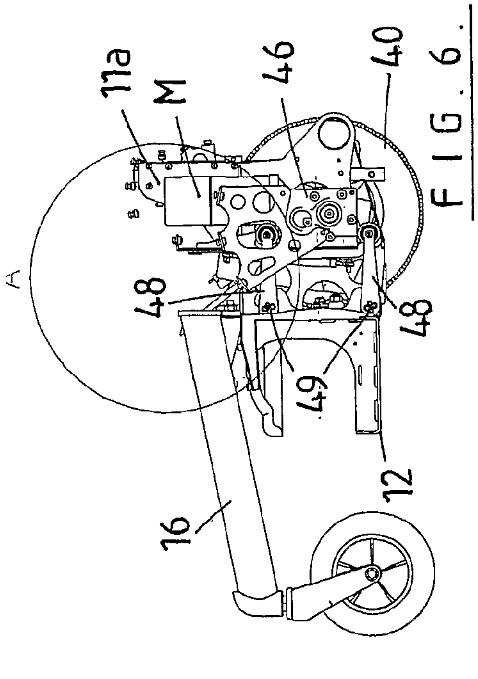
FIG. 6 is a side elevation view of the wheelchair in the form depicted in FIG. 4.
Figure 4:
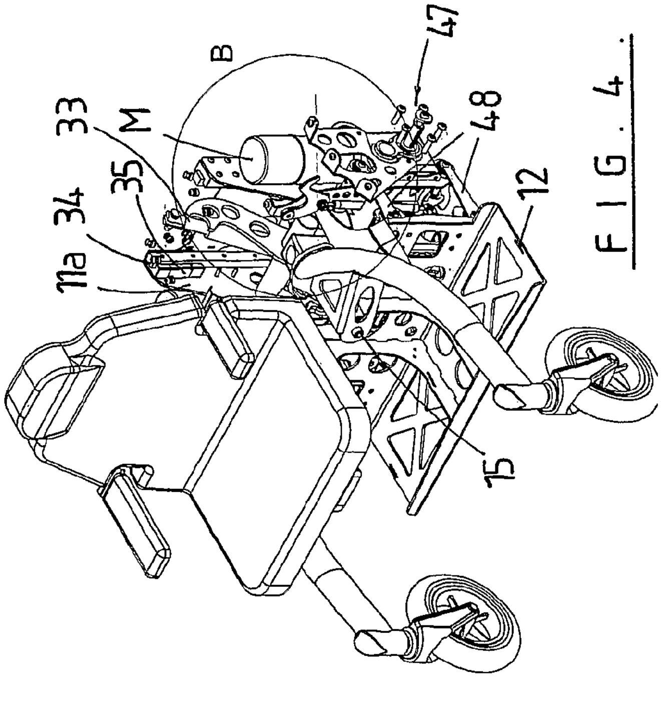
FIG. 4 is a further perspective view with bodywork and the chair removed.

Thus, in Positions 2 and 3 the foot support 20 takes its normal position. However, as the seat 19 is moved towards Position 1, the underside of the foot support 20 comes in contact with the ground surface and, as a result, relative movement between the foot support 20 and the base 24 occurs until the foot support extends outwardly and just below the level of the base 24 as shown in FIG. 3 ("Position 1").

The back 28 of the seat 19 is coupled to a rotating seat support arm 29 via a pivot bearing 20 coupled to the back 28. The other end of the seat support arm 29 is pivotally coupled between a pair of spaced apart chassis members 11*a* (of a sub-chassis) at pivot bearing 31. An electric actuator 32 is pivotally coupled about axis A' to the sub-chassis 11.

Figure 2:
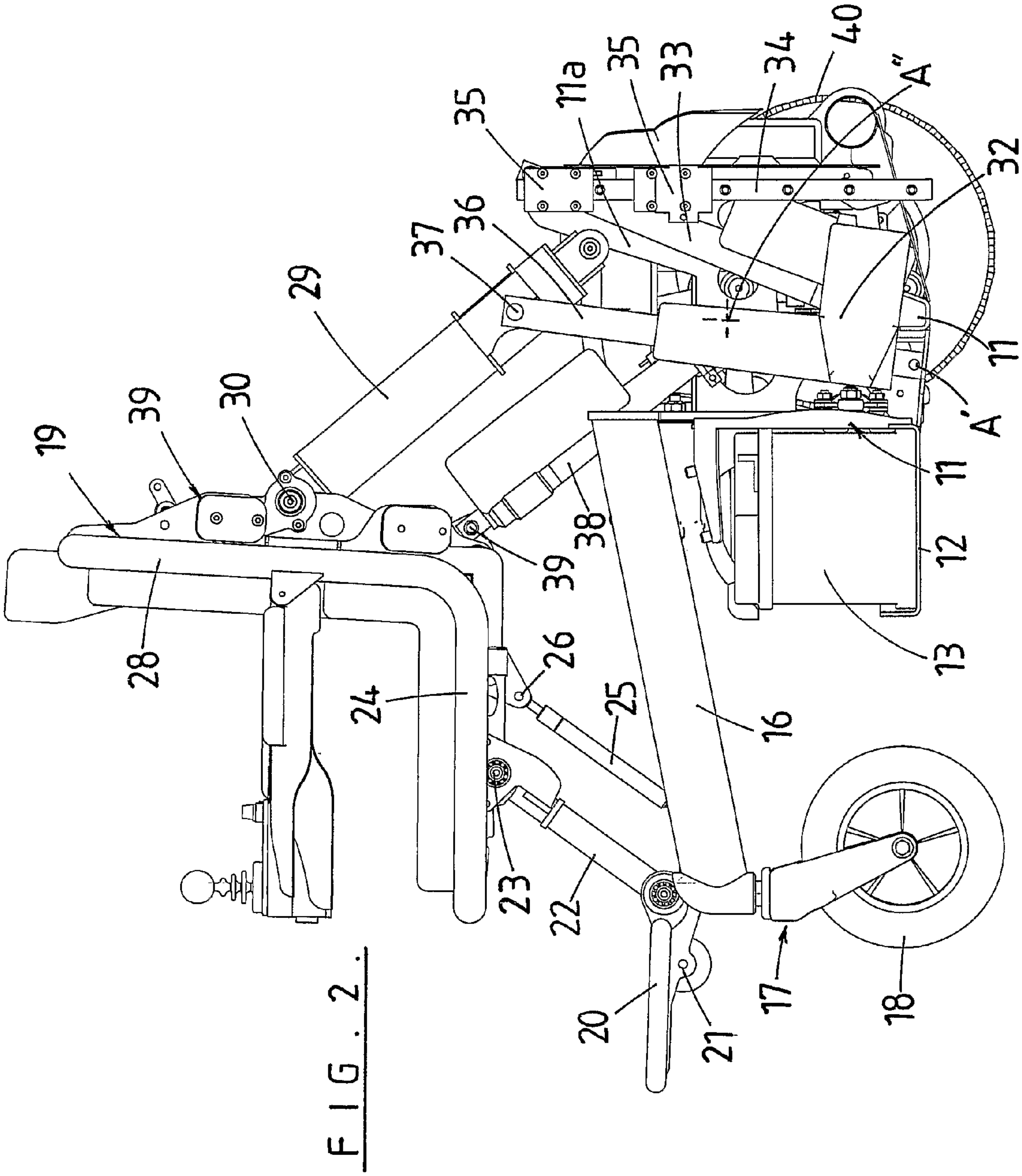
FIG. 2 is a side elevation view with bodywork and one rear wheel removed in the interests of clarity, the wheelchair being shown in the normal operative configuration.

As can be seen in FIG. 2, the chassis 11 has mounted thereto by a suitable support or mounting arrangement two pairs of guides 35. W each pair of guides 35 a rail 34 is slidingly mounted. To each rail 34 is attached a chassis member 11*a*. This arrangement is, as shown in the drawings, adjacent to but forward of the axis of the rear wheels 40.

An electric actuator 33 is mounted between the chassis 11 and the sub-chassis arrangement of the chassis members' 11*a* and rails 34. As the actuator 33 is extended and retracted, the chassis members 11*a* and rails 34 slidingly move in mounts 35.

As a result chassis mounters 11*a* move up and down and carry with them the support arm 29. The actuator 32 also moves up and down as a unit with the sub-chassis. This enables the seat 19 to be moved up and down between Positions 2 and 3. The actuator 33 is thus only used for vertical up and down motion between Positions 2 and 3.

Returning now to actuator 32, it is apparent from the drawings that the piston rod 36 is pivotally coupled by pivot 37 to the rotating seat support arm 29. The electric actuator 32 can thus be operated to move the seat 19 between Positions 1 and 2. As can be seen in FIG. 3 the actuator 32 is fully retracted into the cylinder body when the seat 19 is in Position 1.

A further actuator 38 is pivotally coupled by pivot 39 to a lower part of a seat mount 39 attachable to the back 28 of the seat 19. It is also pivotally coupled to rotate about axis A" to the sub-chassis. This actuator thus moves as a unit with the sub-chassis. The actuator 38 is operable so as to tilt the seat 19. This enables the user to achieve a comfortable sitting angle when the chair is at any height in the range from Position 1 to Position 3.

The actuator 38 does not affect the lowering of the seat by actuator 32 because when actuator 32 operates, the actuator 38 only acts as a fixed length support.

Figure 1:
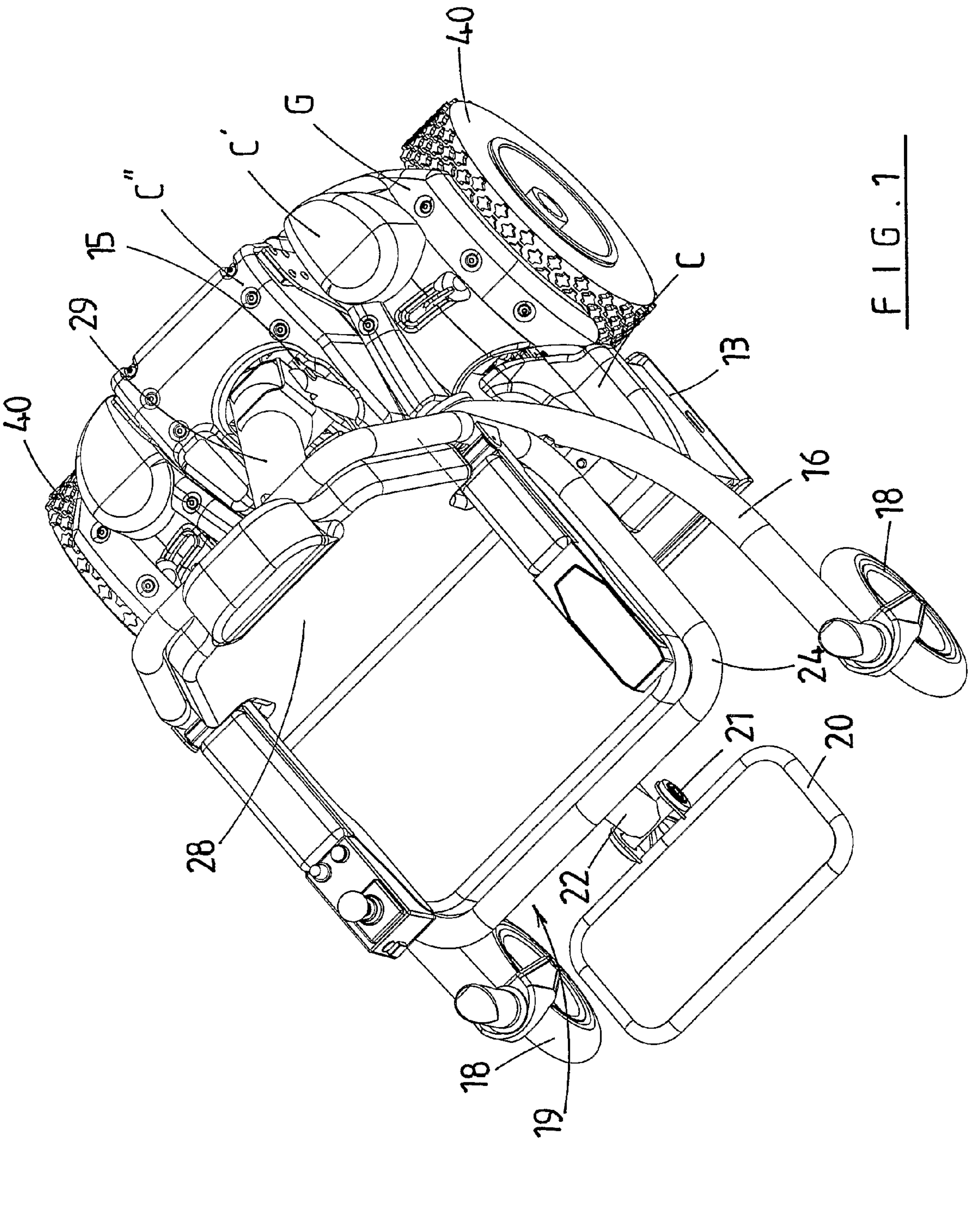
FIG. 1 is a perspective view from above showing the wheelchair in its normal operative configuration.

The space 14 that exists between the batteries 13 in the battery mounts and platform 12 and the suspension mounts 15 for the front arms 16 provides the necessary clearance or cavity for movement of the rotating seats support arm 29 and actuator 38. The relationship of these components and the space 14 is readily apparent from FIG. 1. FIG. 1 also shows the inclusion of battery covers C and a rear cover C' that covers the motors M and other componentry, as well as provide a form of mudguard G that provides partial covering the upper portion of the rear wheels 40. These covers are also apparent in FIGS. 11 and 12.

A further cover C" is coupled to the raising and lowering mechanism i.e. the sub-chassis, the chassis members 11*a*, rails 14 and actuator 33. This cover C" thus moves as the raising and lowering effected by actuator 33 between Positions 2 and 3 occurs (see FIGS. 11 and 12).

Figure 11:
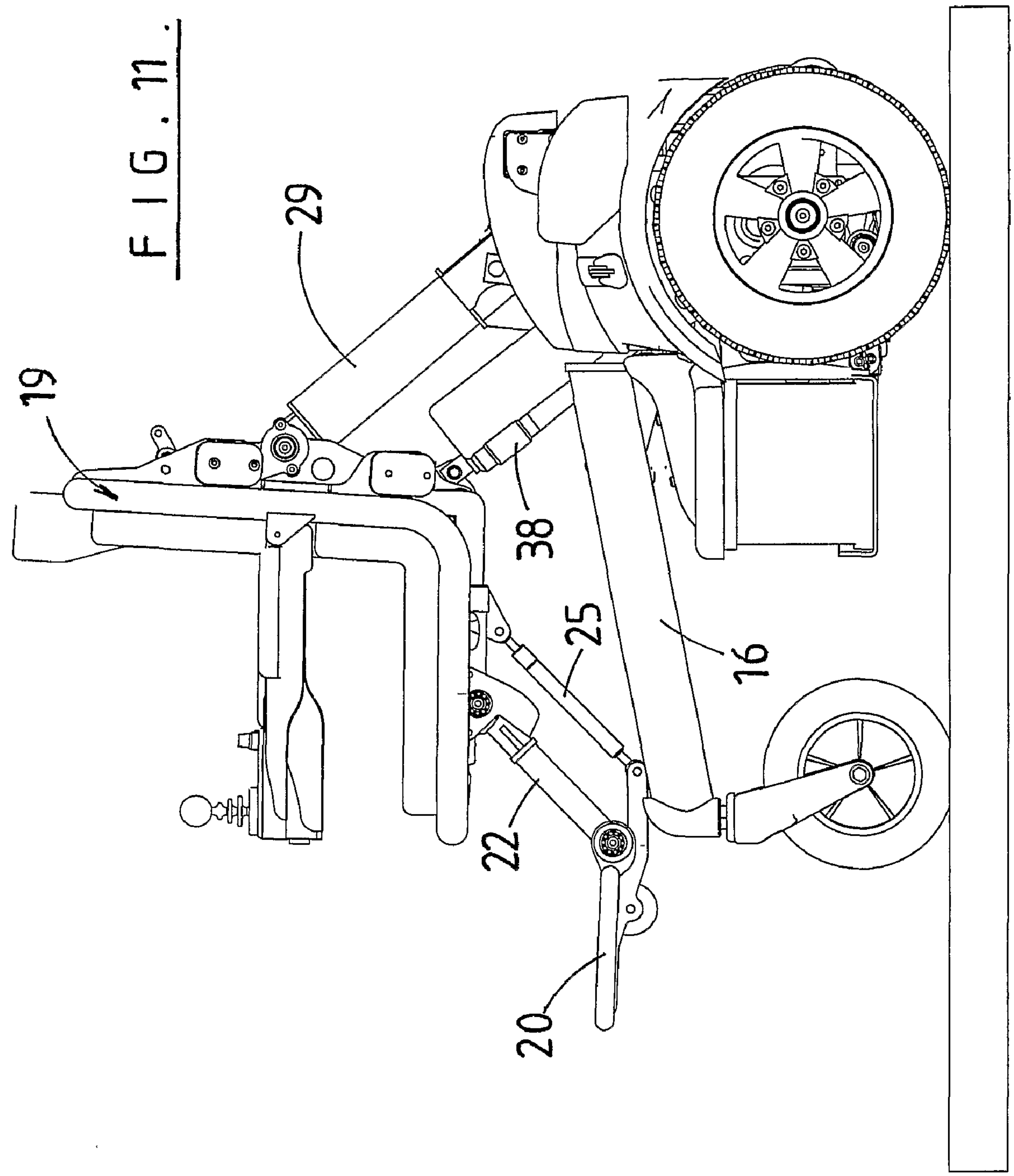
FIG. 11 is a side elevation view showing the extent of normal raising of the seat.
Figure 12:
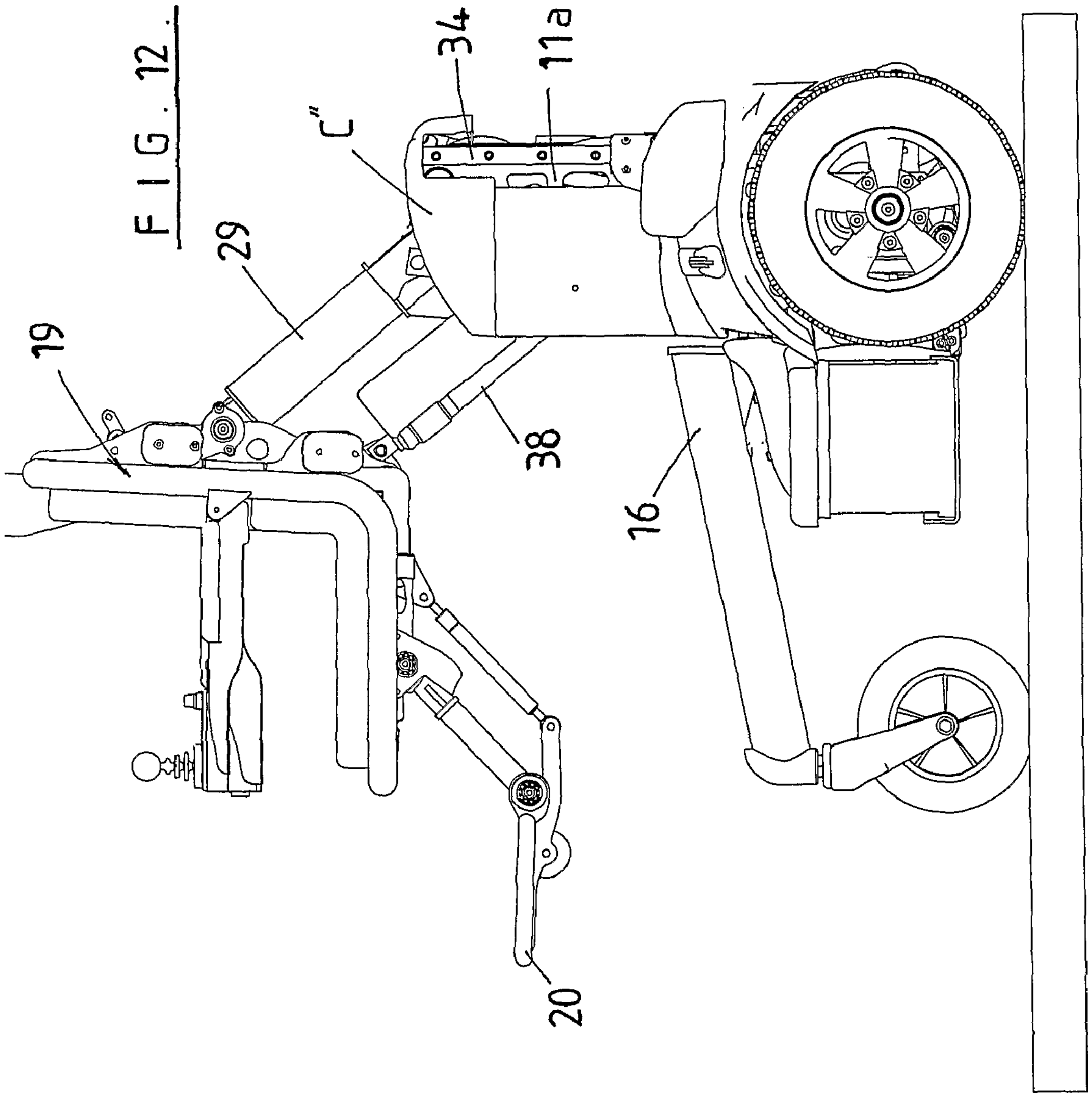
FIG. 12 is a side elevation view of showing the extent of extended raising of the seat.
Figure 13:
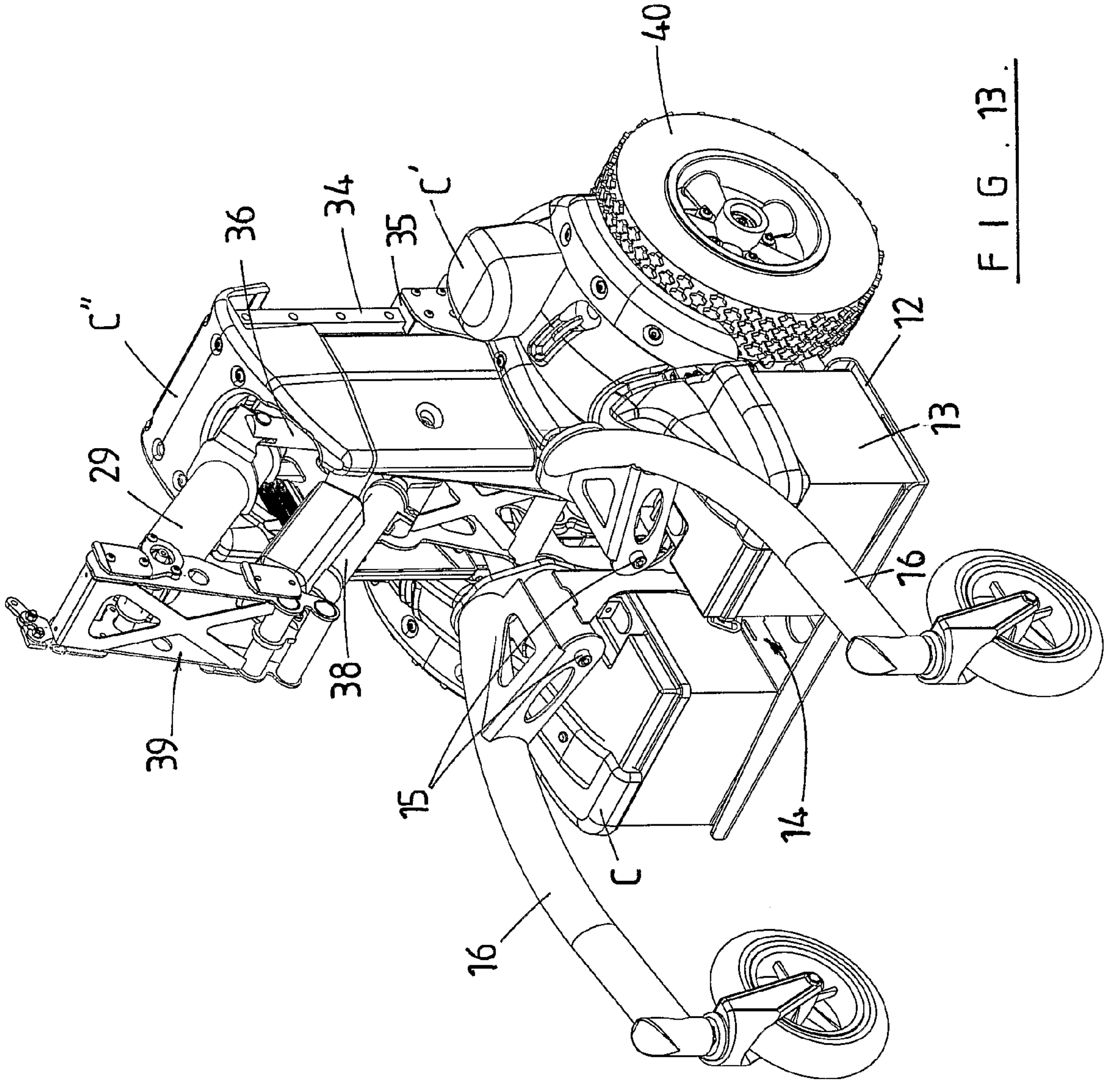
FIG. 13 is a pictorial front perspective view of the wheelchair with the seat mount shown in its fully raised position (Position 3 as hereinafter described)
Figure 14:
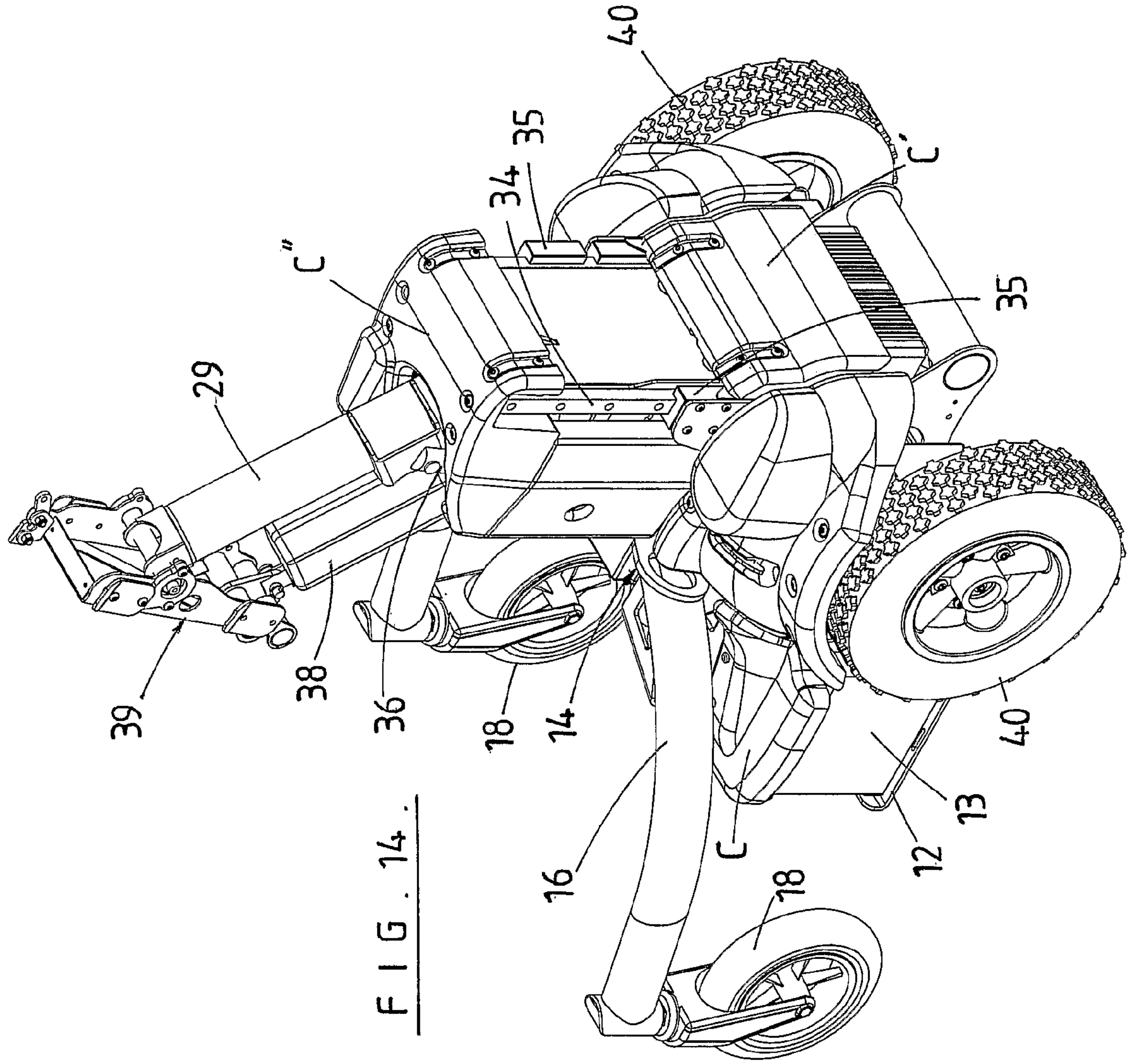
FIG. 14 is a similar pictorial view from the rear and with the seat mount in its normal use position (Position 2 as herein described).

According to one aspect of the invention there is, therefore, provided a wheelchair whereby the seat 19 can be moved from its normal "ride" position (the so-called Position 2) to an elevated or extended height (Position 3) as shown in FIG. 11, and a fully lowered position (Position 1) as shown in FIG. 3.

The movement from Position 2 to Position 1 has the feature of the seat 19 rotating forward and downwardly so that not only is a full downward movement possible but also the seat clears the batteries 13 which, as shown in the drawings, are located directly under the seat when the seat is in Position 2. Therefore, ideal weight distribution is achieved in Position 2 and, as a result, the wheelchair is stable as the chair travels at full speed or near full speed.

The space or cavity 14 that provides clearance between the batteries 13, as previously described, is possible because the pivot axes for the front suspension is actually two separate axes set far enough apart so that the actuator 38 and seat support arm 29 can lower down between the two axes (see FIG. 1).

According to a second invention embodied in the wheelchair there is provided independent suspension as will hereinafter be apparent.

As already described, and as can be seen in the drawings, the front wheels 18 carried by arms 16 are suspended independent from the rear wheels 40. Also each rear wheel 40 is suspended independent from the other. Furthermore, the arms 16 are able to each move about a pivot axis defined by mount 15 but only move independent of each other under a shock loading on one wheel 18.

According to the preferred form of the wheelchair, the front/front independence only occurs under shock loading conditions (i.e. the user drives one front wheel over a stone, low curb or the like). This front/front independence is achieved by having a pretensioned shock 41 (see FIG. 9) that is pivotally coupled at 42 to each of a pair of levers 43 that extend downwardly from each of the pivot mounts 15 of the front arms 16. The shock 41 acts as a solid link when the normal weight of the user is in the seat 19.

Figure 9:
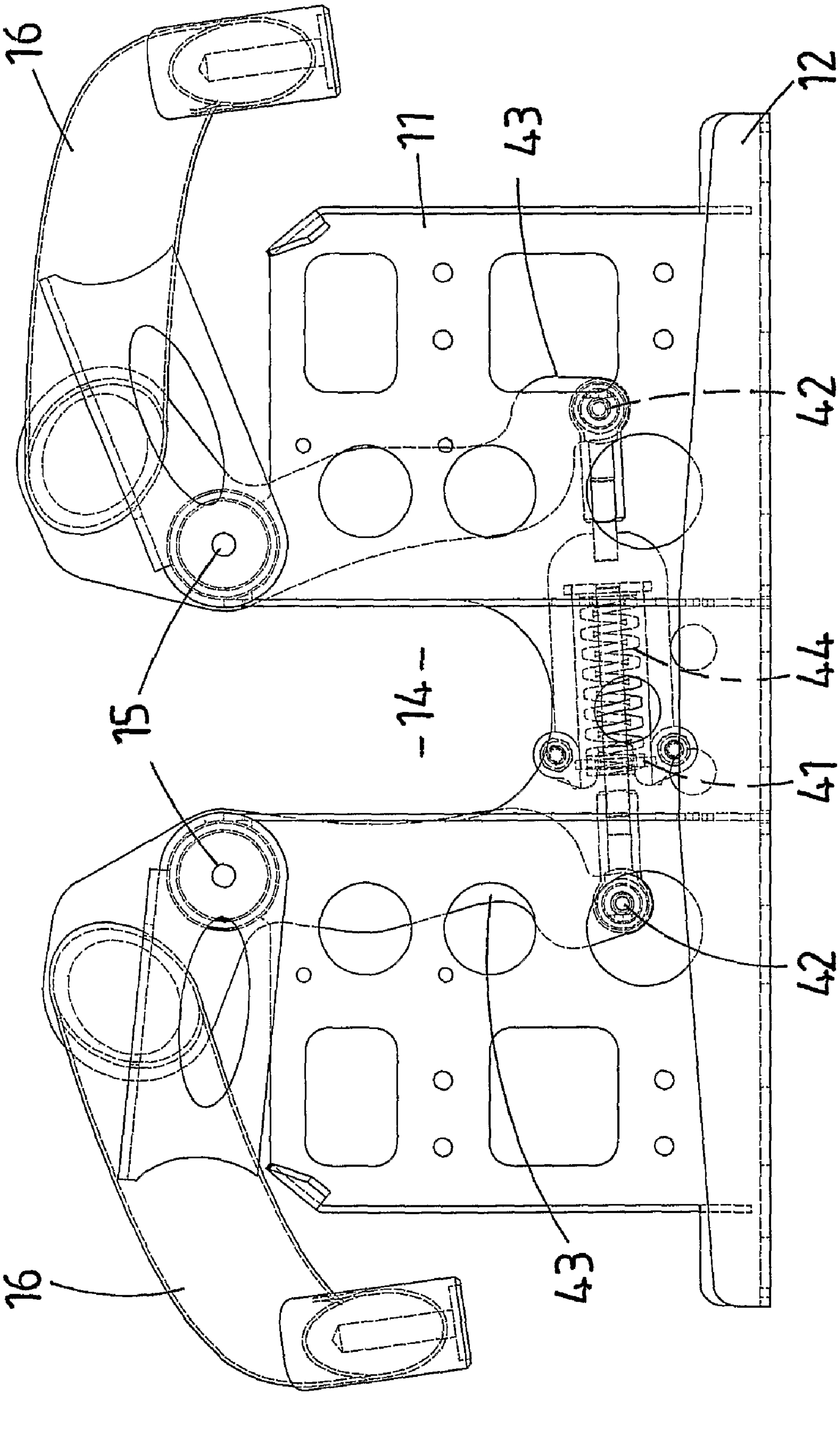
FIG. 9 is a view similar to FIG. 8 but with bodywork, batteries and seat removed and showing a different extended movement of the front arms relative to the chassis.

However, if one of the front arms 16 is shock loaded, the link "breaks" i.e. the pretensioned spring 44 of shock 41 compresses or stretches depending on the direction of shock load on the front wheel. As shown in FIG. 9 one lever 43 is coupled to the body of shock 41 while the other is coupled to a "piston" in the body and engaged by spring 44. As a consequence the shock load is dissipated into the pretensioned spring 44 inside the link 41. This means that the shock load is not transferred back up through the seat 19 to the user.

Figure 8:
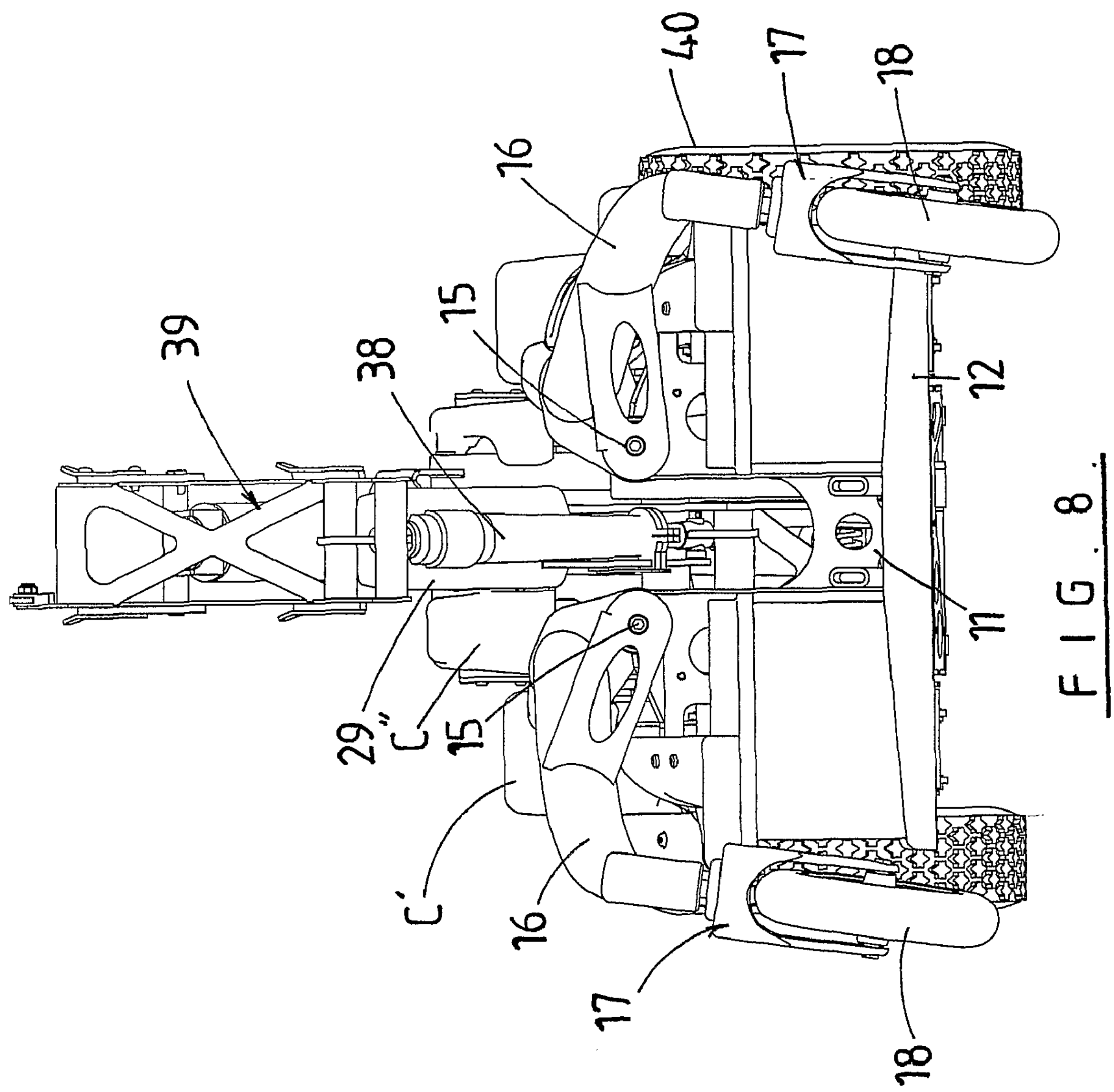
FIG. 8 is a front elevation view, with seat removed, showing how the front arms to which the front wheels are mounted are able to move relative to the chassis and the rear wheels.

Thus, while the front wheels 18 are freely independent from the rear wheels 40, the front wheels 18 are independent from each other under shock loading conditions. Under normal conditions, however, the front wheels 18 are linked via shock link 41 so that on uneven ground etc., the front wheels 18 can "track" the ground surface as shown, for example in FIG. 8. In this way an even weight distribution on all four wheels is achieved therefore leading to better stability of the wheelchair and a resultant ride quality for the user.

As stated above the weight of the user sitting statically in the seat 19 is not sufficient to break the shock link 41. If the shock link does "break" this effectively results in a lowering of the seat position. It will therefore be appreciated that if the shock link 41 were to break open when a user sits in the seat 19 the chair's ride height would consequently be lower than when a user is not in the seat. This would have undesirable side effects.

For example, if a very limited mobility user were to lower the seat 19 to exactly the height of a toilet then slide off the seat and onto the toilet seat the wheelchair would be without the weight of the user. This would result in the seat springing up to a higher level which would then prevent, or lead to difficulties in the user sliding back from the toilet seat to the now higher wheelchair seat. However, with the construction, according to the present invention, the seat remains at the same height irrespective of whether the user is in or off the seat 19.

The independent rear suspension (see FIGS. 4 to 7) is provided by a double clevis type support strut 48 that mounts on one end to the gearbox 46 (from which projects the drive shaft and wheel mount 47) and the other to a rubber supported square shaft (not readily visible but indicated by numeral 49) that mounts onto the chassis 11. The rubber supported square shaft 49 applies the reactive torque force for the operation of the rear suspension.

This independent rear suspension thus further improves the ride quality for the user. Consequently in addition to the fully adjustable nature of the seat 19 the present invention provides a stable wheelchair and one which exhibits better ride quality for the user.

The invention claimed is:

1. A wheelchair comprising:

a chassis, rear and front wheels mounted to the chassis, a support means pivotally coupled, via a coupling, to the chassis and a seat mount, moving means to selectively rotate the support means about the coupling to the chassis to cause the seat mount to be moved between raised and lowered positions, and a clearance provided between one or more of power supply units and suspension mounts to enable the support means to move therein during movement of the seat mount to and from the lowered position, the lowered position being forward and downward of the raised position such that a seat mounted on the seat mount is arranged to be lowered forward of the chassis to floor or ground level.

2. A wheelchair as claimed in claim 1 further including a pair of battery power pack mounts whereby a pair of batteries or power packs can be mounted in a spaced apart array.

3. A wheelchair as claimed in claim 2 wherein the pair of battery power pack mounts are located below a seat when mounted on the seat mount and the seat is in a normal ride position.

4. A wheelchair as claimed in claim 1 wherein there are two front wheels, each front wheel being coupled to an arm one end of which is coupled to a mount located to one side of the clearance.

5. A wheelchair as claimed in claim 1 wherein the support means is coupled to a mounting assembly which is moveably coupled to the chassis, the mounting assembly being moveable to raise the seat mount to a position higher than said raised position.

6. A wheelchair as claimed in claim 5 wherein the mounting assembly includes a linear actuator connected to the chassis and operable to move the mounting assembly relative to the chassis.

7. A wheelchair as claimed in claim 5 wherein the mounting assembly includes a pair of rails slidingly engaged in guides mounted to the chassis, said rails being coupled to the support means.

8. A wheelchair as claimed in claim 5 wherein the support means is a fixed length arm and coupled to the arm is a linear actuator mounted by the mounting assembly, the arm linear actuator being operable to move the arm relative to mounting assembly.

9. A wheelchair as claimed in claim 8 further including a further linear actuator pivotally coupled by one end to the seat mount and by the other end to the mounting assembly, the further linear actuator being operable to adjust the tilt of the seat mount relative to the arm linear actuator.

10. A wheelchair as claimed in claim 5 wherein the movement of the seat mount from the raised position to the higher position is vertical movement.

11. A wheelchair as claimed in claim 1 further including a seat mounted to the seat mount and a foot support suspended therebelow by a linkage that enables the foot support upon contacting a surface when the seat is lowered to move relative to the seat and maintain a substantially level attitude.

12. A wheelchair as claimed in claim 1 wherein there are two rear wheels, which are independently sprung by suspension means.

13. A wheelchair as claimed in claim 12 wherein each front wheel is coupled to an arm which is pivotally coupled to the chassis and shock absorbing means is coupled between the arms, the shock absorbing means being operable to permit the arm of one front wheel to move about its pivot coupling independent of the arm of the other front wheel upon a shock loading being applied to said one wheel.

14. A wheelchair as claimed in claim 12 wherein each rear wheel is coupled to a drive shaft projecting from a gearbox of the drive means for the wheel, said gearbox being connected by a double clevis type support strut arrangement each strut being pivotally coupled to the chassis.

15. A wheelchair as claimed in claim 14 wherein each strut is coupled to the chassis by a rubber supported shaft which is mounted to the chassis.

16. A wheelchair as claimed in claim 1 wherein a separate drive motor drivingly coupled to each rear wheel.

17. A wheelchair as claimed in claim 1, wherein, while the seat mount is in the lowered position, a foot support coupled to the seat mount so as to move with the seat mount extends farther forward than a position of the front wheels.

18. A wheelchair as claimed in claim 1, wherein, while the seat mount is in the lowered position, a seat coupled to the seat mount so as to move with the seat mount extends farther forward than a position of the front wheels.

19. A wheelchair including:

i) a chassis;

ii) rear and front wheels mounted to the chassis;

iii) a seat mount, iv) a support including a first end pivotally attached to the seat mount and a second end pivotally attached to the chassis;

v) an actuator configured to rotate the support about the support's attachment to the chassis to cause the seat mount to be moved between a raised and a lowered position, the lowered position being forward and downward of the raised position such that a seat mounted on the seat mount is arranged to be lowered forward of the chassis to floor or ground level; and vi) a clearance between one or more of power supply units and suspension mounts, the clearance being arranged such that the support moves in the clearance during movement of the seat mount to and from the lowered position.

* * * * *